United States Patent
Loy

(10) Patent No.: US 7,219,441 B2
(45) Date of Patent: May 22, 2007

(54) PHREATIC SURFACE MEASURER TERMINAL

(76) Inventor: Antonio Loy, 35 Via Monta Senario, Roma (IT) 00141

( * ) Notice: Subject to any disclaimer, the term of this patent is extended or adjusted under 35 U.S.C. 154(b) by 0 days.

(21) Appl. No.: 11/339,084

(22) Filed: Jan. 25, 2006

(65) Prior Publication Data

US 2006/0162177 A1    Jul. 27, 2006

(30) Foreign Application Priority Data

Jan. 26, 2005   (IT)   ............ RM2005A0038

(51) Int. Cl.
*G01B 3/10* (2006.01)
*E21B 47/04* (2006.01)
(52) U.S. Cl. ................... 33/760; 33/770; 33/713
(58) Field of Classification Search ............ 33/713, 33/716, 720, 759, 760, 768, 770; 73/290 R, 73/292

See application file for complete search history.

(56) References Cited

U.S. PATENT DOCUMENTS

| | | | |
|---|---|---|---|
| 4,305,206 A * | 12/1981 | Roe | 33/770 |
| 4,623,264 A * | 11/1986 | Mitchell | 73/292 |
| 6,456,201 B1* | 9/2002 | Mioduszewski et al. | 73/290 R |
| 6,883,246 B1* | 4/2005 | Latham | 33/720 |
| 2005/0241172 A1* | 11/2005 | Holland | 33/760 |
| 2005/0246917 A1* | 11/2005 | Webb et al. | 33/760 |

* cited by examiner

*Primary Examiner*—G. Bradley Bennett
(74) *Attorney, Agent, or Firm*—George F. Wallace, Esq.

(57) ABSTRACT

A terminal, for use with a phreatic surface measurer having a tape measure with at least one sensor at one end of the tape measure, includes a flexible protection element that substantially surrounds the tape measure, and a coupler between the flexible protection element and the sensor, where the flexible protection element protects the tape measure along a part of its length without substantially impeding its flexibility. Optionally, two elements can be used and connected to each other by a connector. Also optionally, a breakaway feature can allow the replacement of terminals or portions thereof.

20 Claims, 2 Drawing Sheets

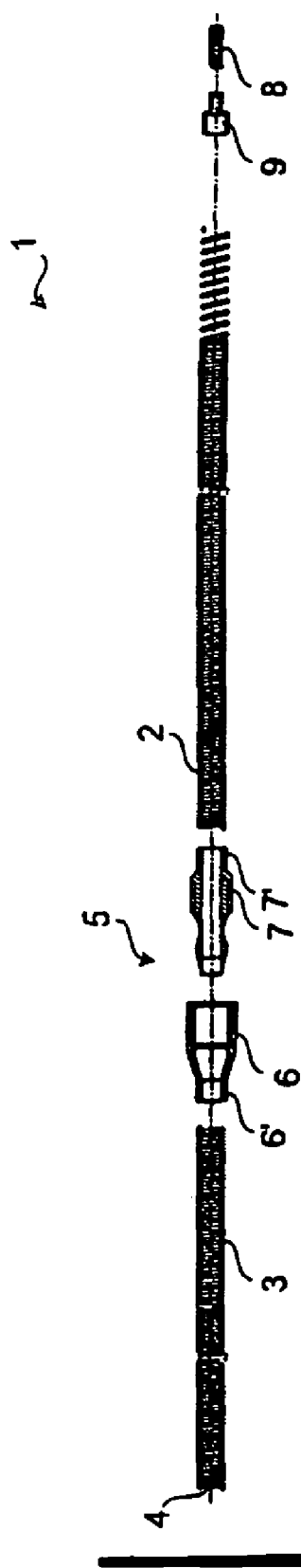
Fig. 1
Fig. 2

PHREATIC SURFACE MEASURER TERMINAL

CROSS-REFERENCE TO RELATED DOCUMENTS

This document claims the priority benefit, and incorporates by reference in its entirety, Italian Patent Application No. RM2005A0038, which was filed on Jan. 26, 2005 by ANTONIO LOY.

FIELD OF THE INVENTION

The present invention relates to measuring devices, and more specifically, to phreatic surface measurers. More specifically, the present invention relates to phreatic surface measurer terminals.

BACKGROUND OF THE INVENTION

Phreatic surface measurers are generally known as instruments used to measure water levels (within piezometers, wells, tanks, etc.), the knowledge of which are important in various research fields, such as geotechnics, hydrology, and more generally, environmental studies.

Phreatic surface measurers generally include four main components:
 a winding system;
 a tape measure;
 a data detection and display system; and
 a terminal (or sensor(s)).

Generally, a winding system can include a bobbin, with a winding mechanism, such as a handle mounted on a support frame, for example and not in limitation. A bobbin body can provide various measurement electronics, including circuitry, a communication system for communicating measured parameters, and a power source, such as a battery, for example and not in limitation. A support frame can further include a friction/blocking system for the bobbin, to adjust its sliding and for housing the terminal when not in use.

A tape measure can generally include electrical wires, connecting the electronics and/or circuitry to one or more sensors provided at the terminal, and a detection and/or processing apparatus. The tape also provides a support core, which is flexible but resistant to bending stresses.

A necessary requirement of measuring tapes can be that of providing a negligible lengthening without plastic deformations when subjected to even remarkable traction stresses.

Measure tapes usually have a circular section with a diameter ranging between 4 and 5 mm, and made up of rubber, thus efficiently protecting the inner electrical wires. KEVAR is presently widely used for the wire resistant core, whilst anti-scratch polyurethane is widely used for the outer sheath.

Despite rubber being a very resistant and flexible material, its use is often inconvenient, as it creates remarkable friction. This creates significant drawbacks when carrying out measurement operations, mainly at the ends.

A terminal is the component that is connected to the free end of a tape measure, and has the one or more sensors built-in. Main features a terminal must generally possess are the following:
 a sufficient weight to maintain the tape measure in a straight orientation;
 the presence of openings (such as holes or slits) close to the sensor to allowing the exit of water from the sensor when withdrawing the terminal from water, and the existence of an electrical bridge that would prevent quick measurements (for example, that which can be necessary for measuring a dynamic level during the withdrawal from a well);
 being comprised of a suitable material to avoid chemical contamination with water with which it is in contact.

A data detection and display system can include electrical or electronic apparatuses provided with suitable optical and sound signaling mechanisms.

Terminals presently available on the market differ in their respective structures and the types of sensors employed.

For example, some terminals employ piezometers as measurement instruments, and can structurally include tubes (usually PVC tubes) provided within drillings made within the ground, and with holes or slots allowing the inflow and outflow of stratum water.

From a structural perspective, a terminal can be represented, in its simplest form, as a metallic tubular body housing electrical wires, and providing a sensor on its free end.

In order to permit the measurement of water levels, electrical circuits are usually employed, and generally include a power supply, a current flowing passage, and a switch provided on the lower end of the terminal (the sensor), which uses the conductive properties of water for electrically closing the circuit.

Many phreatic surface measurer models, in order to give the opportunity of measuring other desired parameters, provide the above technical scheme integrated with other types of sensors, such as the following:
 sensors for measurement of water temperature (thermophreatic surface measurers);
 pH measurement sensors; and
 sensors for measuring electrical conductivity.

Often, however, there is a need for measuring piezometers, static and/or dynamic levels within wells equipped for water drawing, for example, wells provided with filters, a pump, a motor, an inlet conduit with relevant spacers from the coating (if provided), and motor supply cables. This occurs frequently, as most existing wells, mainly those for private use or for drawing small amounts of water, do not include piezometers due to cost limitations.

Presently known measurers suffer from at least the following drawbacks:
 The terminal can meet an obstacle, often being an inlet conduit spacer. In this case, the halting of a phreatic surface measurer terminal's advancement cannot be timely revealed to the operator at the surface, with the operator continuing to unwind the bobbin until the progressive reduction of tension makes the situation evident. Also, the subsequent re-winding of the cable about the bobbin, which is necessary to repeat the attempt of lowering the instrument, can be precluded by the winding of the tape measure around projections that could be present (such as spacing brackets, bolts and nuts, etc.), or by the formation of a tape measure skein knotted about the phreatic surface measurer terminal, and thus preventing the terminal from passing through narrow spaces.
 The descent and ascent of the terminal assembly, plus the oscillations of the same about the vertical axis, can cause its wrapping around an obstacle, such as a water inlet conduit and/or electrical wires supplying power to a pump motor. Attempts to free the terminal from such conduits are difficult due to the reduced space available and due to the friction of the tape with such obstacles, and further can be hindered, or even completely precluded, by the presence of projections, bolts and nuts, brackets, etc., or by couplings between a conduit and wires, where the terminal can be effectively fixed thereto indefinitely.

It is clear that the above procedure is quite inefficient both cost-wise and time-wise due to the various problems addressed above. Indeed, often measurer operators lose at least a portion of the measurer itself, leaving the same within the well, and resulting in significant damage to the measurer.

BRIEF SUMMARY OF THE INVENTION

It is, therefore, an object of the invention to provide a phreatic surface measuring terminal.

In one embodiment, the present invention relates to a terminal that eases the process of measuring environmental data with phreatic surface measurer by reducing the risk that the measurer, or portion thereof, becomes stuck when introduced in or withdrawn from wells and the like.

It should be noted that the specification addresses the use of phreatic surface measurers within equipped wells, but it will be apparent to one of ordinary skill in the art that the same is not limited to this specific environment.

Depending on the particular embodiment, and the desired structure and configuration thereof, the present invention can be geared towards at least one of the following objects:

One object is to provide a phreatic surface measurer terminal that provides elastic and/or flexible properties, and a profile that minimizes the risk of the same becoming fixed (or stuck), both during descents and ascents, by fittings or other obstacles provided within a well or hole.

Another object is to provide a terminal including a material having a reduced friction coefficient, while providing a weight sufficient for stretching out a tape measure of a phreatic surface measurer, thereby promoting a more accurate perception by an operator that the same is resting against, or otherwise obstructed by, an obstacle.

A further object is the selection of the above-noted material to prevent chemical contaminations within stratum water.

An additional object is to provide a small-dimensioned connection between a tape measure and terminal to resist traction stresses.

BRIEF DESCRIPTION OF THE DRAWINGS

The present invention is illustrated by way of example, and not limitation, in the figures of the accompanying drawings, in which:

FIG. 1 illustrates an exploded lateral side of an improved phreatic surface measurer terminal according to the present invention;

FIG. 2 illustrates a sectional lateral view of the terminal of FIG. 1;

DETAILED DESCRIPTION OF THE INVENTION

Figure 3:
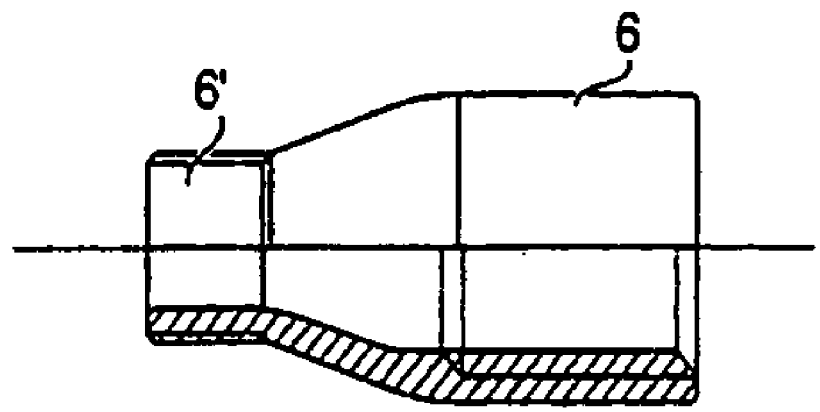
FIG. 3 illustrates a lateral view of a first element of an exemplary pin-coupling device.

The invention will now be described in more detail by way of example with reference to the embodiments shown in the accompanying figures. It should be kept in mind that the following described embodiments are only presented by way of example and should not be construed as limiting the inventive concept to any particular physical configuration or order.

FIG. 1 illustrates a lateral view of an exemplary embodiment of a phreatic surface measurer terminal 1 according to the present invention. As illustrated, terminal 1 can include first and a second springs 2, 3 through which tape measure 4 passes, said tape measure being provided with at least one electrical wire. In one embodiment, a single wire can be provided with tape measure 4, with the single wire carrying a signal from the sensor. Alternatively, plural wires can be provided to carry current and/or one or more signals. Also, notably, a single spring may be utilized to the extent desired.

According to an exemplary aspect of the invention, second spring 3 can have a longer pitch in its end portion to allow the outflow of water or foams away from sensor 8.

According to another exemplary aspect of the invention, first and second springs 2, 3 can each include a connector or connecting device 5 (such as a pin-based connector, for example), which can have, for example, first and second connector elements 6, 7. Connector 5 can allow, for example, easy separation of terminal 1 from tape measure 4. Further, adherence to any present hygienic rules or guidelines can be facilitated therefrom. Of course, however, connector 5 can be a provided in a one-piece design to the extent desired.

According to a further exemplary aspect of the invention, connector elements 6, 7 can have a substantially cylindrical shape, although alternative shapes can be utilized as long as they do not defeat the function of the present invention. Further, second connector element 7 can be tapered at one end and can be connected to first connector element 6 by a partial insertion therein. Still yet further, first and second connector elements 6, 7 can be connected by any means desired within the spirit of the present invention, such as, for example and not in limitation, via a fixed joint, a crimp, at least one screw, at least one screw ring nut, or a weld.

According to yet another exemplary aspect of the invention, connector elements 6, 7 can have respective ends 6', 7' that can be connected to springs 2, 3. For example, ends 6', 7' can have a diameter slightly larger than the respective spires of springs 2, 3. Accordingly, ends 6', 7' can be introduced within springs 2, 3 such that the helicoidal spires of springs 2, 3 can connect connector elements 6, 7 to springs 2, 3, respectively. Furthermore, one or both of springs 2, 3 can be welded to connector elements 6, 7, respectively, where permanent connections are sought. Indeed, any connecting methodology within the spirit of the invention may be utilized to connect connector elements 6, 7 to springs 2, 3.

According to yet a further exemplary aspect of the invention, at the free end of spring 2 can be sensor 8, which can be coupled to containment element 9 (or coupler 9). Containment element 9 can couple tape measure 4 to sensor 8. Further, it can permit coupling with the end section of said spring 2. Additionally, containment element 9 can include a section that can enter within the end section of spring 2 causing a widening of its helicoidal spire.

In still yet another exemplary aspect, a suitable weight can be determined based on the suitable choice of the spring length.

Reference in now made to FIG. 2, which illustrates an exemplary assembling of terminal 1. It is illustrated that connector elements 6, 7, as well as sensor 8 and containment element 9, can be fixed to the ends of springs 2, 3 via the widening of the respective helicoidal spire sections. Further, it is evident that springs 2, 3 protect tape measure 4 substantially acting as a protective (e.g., steel) layer, thus maintaining the overall flexibility of terminal 1.

In still yet a further exemplary aspect of the invention, springs 2, 3 can be made from steel, which can provide an optimum flexibility for the desired use of terminal 1 when the at least one wire has a reduced diameter (about 0.5–1.0 mm, for example).

Figure 4:
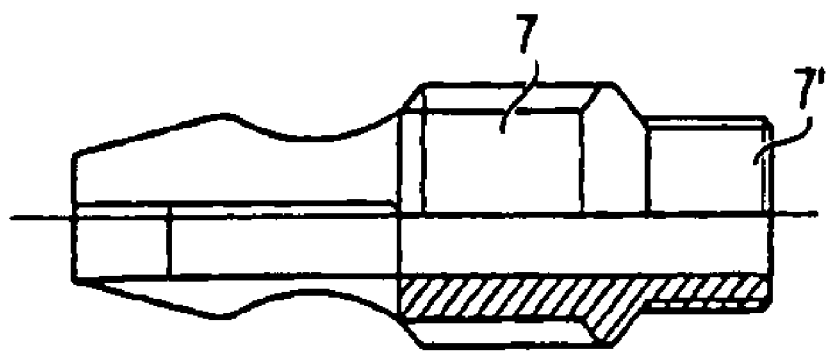
FIG. 4 illustrates a lateral view of a second element of an exemplary pin-coupling device.

FIGS. 3 and 4 illustrate exemplary embodiments of connector 5, which as noted above can include connector elements 6, 7. In another exemplary aspect, connector element 6 can include an inner section within which connector element 7 can connect, for example and not in limitation, by way of a groove. Notably, the at least one wire or the ground of electrical ends accompanying tape measure 4 can be connected to springs 2, 3, which can be formed from steel, for example and not in limitation. Further, first and second connector elements 6, 7 can connect with each other in a threaded manner to the extent desired. For example, an inner section of connector element 6 and an outer section of connector element 7 can each be provided with compatible threads, and therewith engage in a screw-like manner.

In still a further exemplary aspect of the invention, the present invention can include a break-away feature at any connection or coupling point of the terminal, such that an upward force can be applied if the terminal or portion thereof becomes stuck within a hole or well, with the terminal or a portion thereof separating from the measurer. This feature can be advantageous where the terminal becomes stuck or otherwise fixed at a point below the surface, thereby leaving the stuck terminal or a portion thereof below the surface while salvaging components of the measurer. Accordingly, a new terminal or portion thereof can be re-attached to the measurer for subsequent measurements.

Based on this disclosure, it will be apparent to one of ordinary skill in the art that the present invention is a phreatic surface measurer terminal. According to one embodiment, such a terminal can include one or more springs to, inter alia, provide a convenient means for interchanging sensors whilst maintaining a desired overall flexibility of the terminal.

An additional advantage of the present invention is that the use of one or more springs, due to the additional weight thereof, not only provides protection of the tape measure, but also avoids the need to add additional weights to a terminal.

A further advantage of the present invention is that such a terminal expedites the quick outflow of water, foam, and/or other liquid away from the sensor after desired measurements are obtained.

It will be apparent to one skilled in the art that the manner of making and using the claimed invention has been adequately disclosed in the above-written description of the exemplary embodiments and aspects taken together with the drawings.

It should be understood, however, that the invention is not necessarily limited to the specific embodiments, aspects, arrangement, components, and respective shapes thereof shown and described above, but may be susceptible to numerous variations within the scope of the invention. For example, a wide variety of connection and attachment mechanisms and/or techniques may be employed to connect or otherwise couple the various elements of the disclosed terminal, and are considered within the spirit and scope of the present invention. Accordingly, the specification and drawings are to be regarded as illustrative and enabling, rather than restrictive.

Therefore, it will be understood that the above description of the embodiments of the present invention are susceptible to various modifications, changes, and adaptations, and the same are intended to be comprehended within the meaning and range of equivalents of the appended claims.

Therefore, I claim:

1. A terminal for use with a phreatic surface measurer having a tape measure with at least one sensor at one end of the tape measure, said terminal comprising:
    a flexible protection element adapted to substantially surround the tape measure; and
    a coupler that couples said flexible protection element to the at least one sensor;
    wherein said flexible protection element protects the tape measure along a part of its length without substantially impeding its flexibility.

2. The terminal of claim 1, wherein said flexible protection element includes at least one spring.

3. The terminal of claim 2, wherein the at least one spring provides a lengthening of a spire pitch in correspondence with the at least one sensor.

4. The terminal of claim 2, wherein said at least one spring is formed of stainless steel.

5. The terminal of claim 2, wherein said flexible protection element includes two springs connected to each other by a connector.

6. The terminal of claim 5, wherein the connector includes first and second connector elements, each being respectively connected to a respective end of the first and second springs.

7. The terminal of claim 6, wherein the first and second connector elements are connected by at least one of a fixed joint, a crimp, at least one screw, at least one screw ring nut, and a weld.

8. The terminal of claim 6, wherein the first and second connector elements are respectively connected to the respective ends of the first and second springs by their partial insertion within respective spires of the first and second springs.

9. The terminal of claim 6, wherein one of said connector and said coupler is adapted to respectively disconnect and decouple if a particular amount of separation force is applied thereto.

10. The terminal of claim 1, wherein said coupler is adapted to detach from at least one of said flexible protection element and the at least one sensor if a particular amount of separation force is applied thereto.

11. The terminal of claim 1, wherein said coupler includes a seat for housing the at least one sensor.

12. The terminal of claim 1, wherein said connector is connected to an end of said flexible protection element.

13. The terminal of claim 1, wherein said at least one sensor includes at least one of a piezometer, a thermometer, and an acidity detector.

14. A terminal for use with a phreatic surface measurer having a winding system, a tape measure comprising two electric wires, a rewinding system, a detection element, a user interface, and at least one sensor provided at an end of the tape measure, said terminal comprising:
    a flexible protection element substantially provided around the tape measure; and
    a coupler that connects said flexible protection element to the at least one sensor;
    wherein said flexible protection element substantially surrounds and protects the tape measure along a part of its length without substantially impeding its flexibility.

15. The terminal of claim 14, wherein said flexible protection element includes a spring.

16. The terminal of claim 15, wherein said flexible protection element includes two springs connected to each other by a connecter.

17. The terminal of claim 16, wherein the connector includes first and second connector elements, each being respectively connected to a respective end of the first and second springs.

18. The terminal of claim 17, wherein the first and second connector elements are removably connected by at least one of a fixed joint, crimping, and screwing.

19. The terminal of claim 17, wherein said first and second connector elements are respectively connected at respective ends of the first and second springs by a screw ring nut.

20. The terminal of claim 14, wherein said coupler includes a seat for seating the at least one sensor.

* * * * *